United States Patent
Harrar et al.

(10) Patent No.: US 10,349,132 B2
(45) Date of Patent: Jul. 9, 2019

(54) LIMITING RECORDING DEMANDS

(71) Applicant: COMCAST CABLE HOLDINGS, LLC, Philadelphia, PA (US)

(72) Inventors: Derek T. Harrar, Rydal, PA (US); Roger J. Godin, Berkeley, CA (US); Robin L. Opie, Newtown Square, PA (US); Robert Gaydos, Harleysville, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/456,891

(22) Filed: Aug. 11, 2014

(65) Prior Publication Data

US 2015/0040171 A1    Feb. 5, 2015

Related U.S. Application Data

(63) Continuation of application No. 11/646,705, filed on Dec. 28, 2006, now Pat. No. 8,839,319.

(51) Int. Cl.

| | |
|---|---|
| *H04N 7/173* | (2011.01) |
| *H04N 21/45* | (2011.01) |
| *H04N 21/63* | (2011.01) |
| *H04N 21/458* | (2011.01) |
| *H04N 5/782* | (2006.01) |
| *H04N 21/433* | (2011.01) |
| *H04N 21/4335* | (2011.01) |
| *H04N 21/462* | (2011.01) |

(52) U.S. Cl.
CPC ......... *H04N 21/4508* (2013.01); *H04N 5/782* (2013.01); *H04N 21/4334* (2013.01); *H04N 21/4335* (2013.01); *H04N 21/4583* (2013.01); *H04N 21/4622* (2013.01); *H04N 21/63* (2013.01); *H04N 21/632* (2013.01)

(58) Field of Classification Search
CPC .. H04N 21/63; H04N 21/632; H04N 21/4583; H04N 21/47202; H04N 21/4334
See application file for complete search history.

(56) References Cited

U.S. PATENT DOCUMENTS

| | | |
|---|---|---|
| 6,760,918 B2 | 7/2004 | Rodriguez et al. |
| 7,765,235 B2 | 7/2010 | Day et al. |

(Continued)

FOREIGN PATENT DOCUMENTS

| | | |
|---|---|---|
| CA | 2613063 | 12/2007 |

OTHER PUBLICATIONS

Response to Canadian Office action—CA 2,613,063—Filed with the Canadian Patent Office on Jan. 6, 2015.

(Continued)

*Primary Examiner* — Nasser M Goodarzi
*Assistant Examiner* — Patrick A Ryan
(74) *Attorney, Agent, or Firm* — Banner & Witcoff, Ltd.

(57) ABSTRACT

A method and system of limiting recording demands on digital video recorders and other media records. The limiting being facilitated through analysis of programs and other media available from one or more network resources associated with and/or having capabilities to provide media to the recording element. The network resources may be associated with provider resources, customer resources, and/or any other resource in communication with the recording element.

20 Claims, 2 Drawing Sheets

(56) References Cited

U.S. PATENT DOCUMENTS

| | | |
|---|---|---|
| 2002/0174430 A1 | 11/2002 | Ellis et al. |
| 2003/0086023 A1 | 5/2003 | Chung et al. |
| 2003/0149988 A1 | 8/2003 | Ellis et al. |
| 2003/0237097 A1 | 12/2003 | Marshall et al. |
| 2004/0060076 A1 | 3/2004 | Song |
| 2004/0117839 A1* | 6/2004 | Watson ............ H04L 29/06027 725/87 |
| 2005/0120386 A1 | 6/2005 | Stone |
| 2007/0157266 A1 | 7/2007 | Ellis et al. |
| 2008/0022332 A1 | 1/2008 | Barrett |
| 2008/0104202 A1 | 5/2008 | Barrett et al. |
| 2009/0300673 A1* | 12/2009 | Bachet ............... H04N 7/17318 725/31 |

OTHER PUBLICATIONS

Canadian Office Action—CA Appl. 2,613,063—dated Jul. 13, 2015.
Response to Canadian Office Action—CA App 2,613,063—Filed with Canadian Patent Office on Jan. 5, 2016.
Canadian Office Action—CA App 2,613,063—dated Jun. 27, 2016.

* cited by examiner

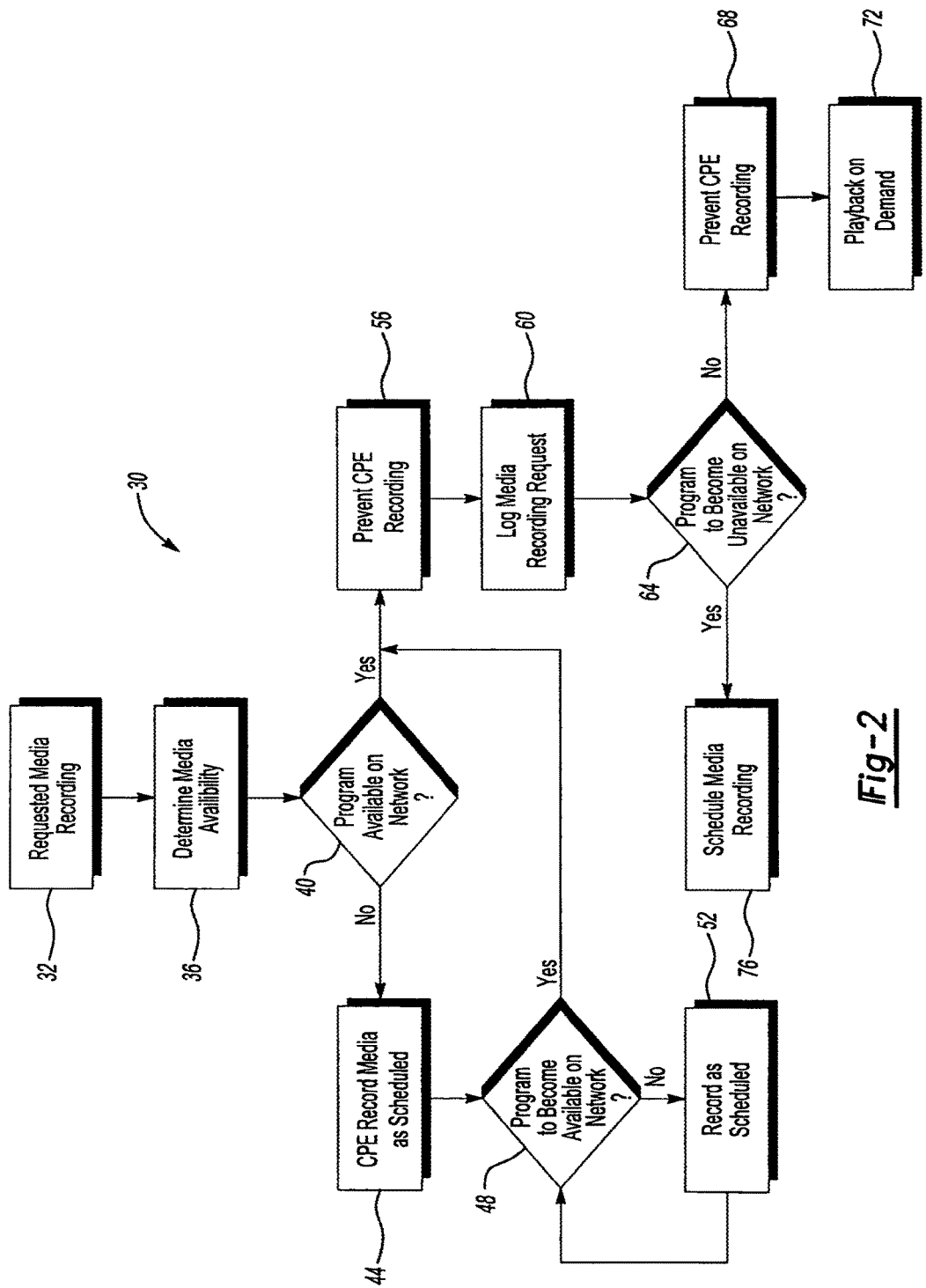

LIMITING RECORDING DEMANDS

CROSS-REFERENCE TO RELATED APPLICATIONS

This application is a continuation of, claims priority to, and hereby incorporates by reference the disclosure of U.S. patent application Ser. No. 11/646,705, filed Dec. 28, 2006, and entitled "LIMITING RECORDING DEMANDS," which issued Sep. 16, 2014, as U.S. Pat. No. 8,839,319.

BACKGROUND OF THE INVENTION

1. Field of the Invention

The present invention relates to limiting recording demands, such as but not limited to limiting recording demands on digital video recorders (DVRs) and other recording elements having capabilities to execute network communications.

2. Background Art

Digital video recorders (DVRs) and other media recording elements typically include a memory, hard drive, tape, or other element to electronically store electronic media, such as but not limited to programs, movies, audio, video, etc. The memory elements are typically limited as to an amount of media that can be stored. Once the memory becomes full or close to full, the recording element may be unable to record new material and/or may be forced to delete previously recorded media in favor of the new recordings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 2 illustrates a flowchart of a method of limiting recording demands of the CPE in accordance with one non-limiting aspect of the present invention.

DETAILED DESCRIPTION OF THE PREFERRED EMBODIMENT(S)

Figure 1:
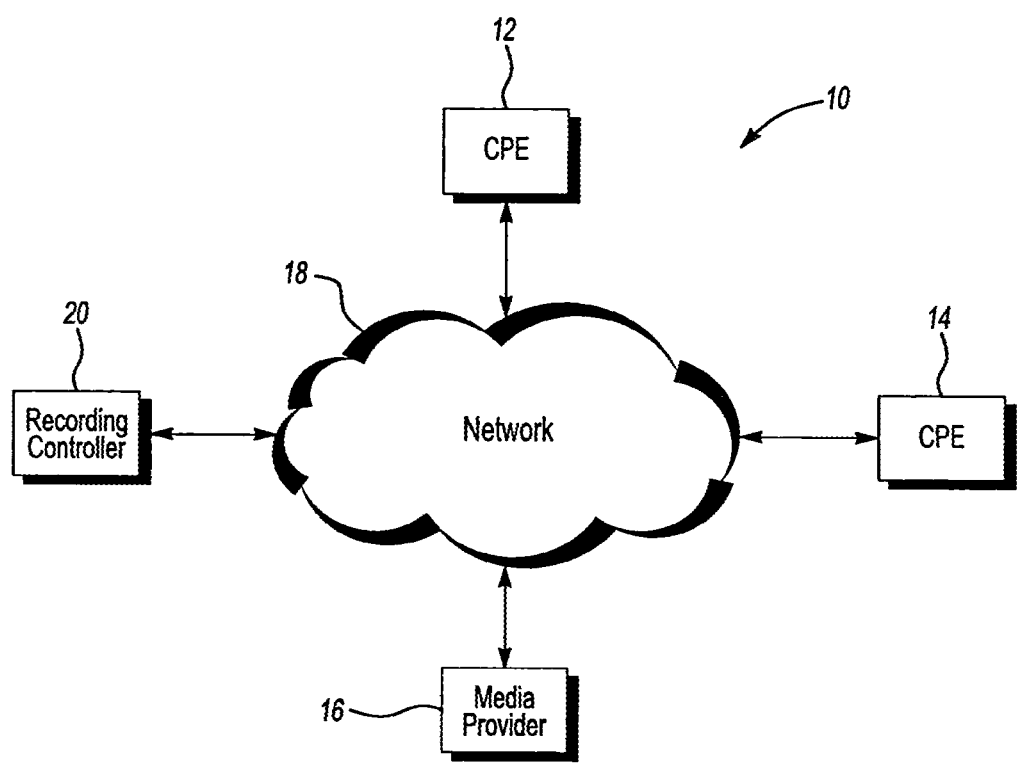
FIG. 1 illustrates a system in accordance with one non-limiting aspect of the present invention.

FIG. 1 illustrates a system 10 in accordance with one non-limiting aspect of the present invention. The system 10 may include a number of pieces of customer premises equipment (CPE) 12-14, a media provider 16, a network 18, and a recording controller 20. The system 10 may be generally referred to as a media content distribution network wherein media content is electronically transferred over the network 18 to the CPE 12-14.

The media provider 16, for exemplary purposes, is most prominently described with respect to being a cable television service provider having capabilities for providing cable television, telecommunications, and/or high-speed data services to the subscriber locations, primarily through wireline and/or wireless communications. The present invention, however, is not so limited and fully contemplates the provider 16 being associated with any type of service provider, including other television providers (IP, broadcast, satellite, etc.) and non-television providers, such as those associated with high-speed data, telecommunications, cellular communications, and the like.

The media provider 16 may be configured to support and/or facilitate the use of any number of television and non-television services and applications, such as, but not limited to email services, data transmission service, linear and non-linear television programming/signaling (cable, satellite, broadcast, etc.), Video on Demand (VOD), interactive television (iTV), interactive gaining, pay-per-view (PPV), digital video recording (local and remote), and/or broadcasting of signals associated with supporting television programming, movies, audio, and other multimedia, as well as, downloading of clips or full-length versions of the same.

The network 18 may include any number of features and devices to facilitate signal transportation and other operations associated with interfacing the subscriber locations with each other and otherwise supporting communications associated with services of the media provider 16. The network 18 may include terrestrial and extraterrestrial components and infrastructures, including cable lines, telephone lines, and/or satellite or other wireless architectures. The network may be associated with other private and/or public networks, such as the Internet and dedicated or virtual private networks.

The CPE 12-14 may relate to any device, element, and other feature associated with interfacing users with various services associated with the media provider, such as but not limited to a settop box (STB), digital video recorder (DVR), personal computer (PC), television (which may include embedded user interface and processing capabilities), outlet digital adapter (ODA), media terminal adapter (MTA), cable modem (CM), personal digital assistant (PDA), computer, mobile device (phone, computer, etc.), personal media device, and any other item having capabilities to supporting access to any number of the services.

The CPE 12-14 may be configured to descramble and to support and/or facilitate the use of any number of television and non-television related signals, such as, but not limited to, Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

Media may be associated with and/or controlled by the media provider 16 (which in turn may receive the content from other sources). The media may be sourced from the media provider directly, from one or more of the subscriber devices 12-14 connected to the network 18, such as but not limited to peer-to-peer environments, and/or from any other source in communication with the network 18 (internet, etc.). For example, if the media provider 16 is a television service provider, a portion of the media content may relate to television programs, movies, and other multimedia packets. The media content may be delivered to the subscriber locations directly from the media service provider 16 and/or from one or more of the other CPEs 12-14 in communication with the network 18.

The recording controller 20 may be configured to coordinate or otherwise facilitate the recording of media content by the CPE 12-14. It may include memories, processors, communication features, and the like to facilitate communication with the media provider and/or CPE 12-14 and to instruct the operation thereof, as described below in more detail. The recording controller 20 is shown as a standalone item, however, it may be included with the content provider 16, CPE 12-14, and/or other features associated with the network.

FIG. 2 illustrates a flowchart 30 of a method of limiting recording demands of CPE in accordance with one non-limiting aspect of the present invention. The method generally relates to instructing or otherwise controlling operation of the CPE to record programs or other media content so as to limit memory consumption of the CPE or otherwise manage storage capacity. This may optionally include preventing recording to the CPE when the recorded media is available from another network resource.

Block 32 relates to determining a request to record media content. The request may be received by the CPE and communicated to a recording controller. The recording request generally relates to any desire of a user to record or otherwise store media content on the CPE for later viewing. The CPE and recording controller may be suitable configured to interrogate the recording request and to communicate with each other regarding the same. For example, if the CPE is a DVR, the request may be made through a user interface, menu, or other feature associated with operations of the DVR.

Block 36 relates to determining an availability of the requested media content. This may include the recording controller executing any number of operations to determine whether the media content is available from one or both of the media provider, from one or more of the other pieces of CPE in the system, and/or from some other source. The availability of the media content generally relates to whether the media content is available from a network resource. The network resource may related to the media provider, CPE, and/or other element in the system.

The network resources of interest may include those having capabilities to support transporting or otherwise delivering requested media to the CPE upon request. The network resources may be those having a capabilities to store media content, as opposed to broadcast sources and the like that merely transmit media on an on-going basis. The media provider, for example, my include a video on demand platform and/or a remote recording element for storing and transmitting media content upon request. Likewise, the other CPE, such as but not limited to those in a peer-to-peer relationship, may be similarly used for storing and transmitting media content upon request.

Block 40 relates to determining whether the requested media content is available and/or likely to be available in the future from network resources, such as but not limited to resources associated with the media provider, one or more of the other CPEs, and/or another resource in communication with the requesting CPE by way of the network. A media content identifier may be included within the media content request for use by the recording controller in accessing information associated with the availability thereof.

For example, the CPE and/or content provider may be configured to periodically provide an inventory of stored media content to the recording controller. The recording controller may cross-reference the received identifiers with the inventory information received from the content provider and the other pieces of CPE to facilitate determining whether the requested content is available from the network. This information may be periodically updated and tracked so as to provide a relatively quick method for assessing the availability of requested media.

The requested media may be determined to be available from the network if one or more of the network resources includes a copy of the media that can be played or otherwise retrieved for deliver to the requesting CPE when desired. The media provider may include a video on demand platform or other on demand or customer requestable system for transporting the requested content to the customer when needed. Likewise, the other pieces of CPE may include communication capabilities for transporting the media content to the requesting CPE.

Block 44 relates to the requested media being unavailable and recording the requested media content with the CPE as scheduled. This may include the CPE executing programmable operations to record the media content on a local hard-drive, memory, or other storage device. For example, if the requested media content relates to a television program or movie scheduled to show at a particular time of day, the CPE may be instructed by the recording controller or through a local selection process to record the program at the scheduled time of day.

Block 48 relates to monitoring one or more scheduled CPE recordings to determine whether the previously unavailable media has become available on a network resource. For example, if a limited number of resources are requesting the media, the media provider may elect not store in the media content on a network recording element. However, if multiple requests are received for the same media content, the media provider may elect to store the media on the network recording element such that network availability of the media may change from being unavailable to becoming available. Similarly, if another piece of CPE records the requested media at some point after the media is requested and before it is stored, the requested media may now be available from the other CPE (network resource).

If the availability of the media has not changed, Block 52 is reached and the media is recorded as scheduled. Optionally, just prior to recording the media, the CPE may revert back to Block 48 in order to check for any last minute change in availability. This may be helpful if the CPE is unable to keep up with changes in availability and/or to limit the number of times availability must be checked. Rather, the continuously checking availability, the CPE may check availability just prior to occurrence of the recording event.

Block 56 relates to the requested media being available and preventing the requesting CPE from recording the requested media content. The recording controller may be configured to instruct the CPE not to record the media content if the media content is available or will be available from the network resources. For example, if the CPE is requesting recording of a television program at a particular time of day, the recording controller may instruct the CPE not to record the program if the program is available on demand from the content provider or one of the other pieces of CPE.

The ability to prevent local recording in favor of on demand availability, either from the content provider and/or one of the other CPEs, such as from another CPE scheduled to record the same program and/or another CPE that may have already recorded or otherwise obtained the requested media content, removes the need to store another copy of the program on the requesting CPE. This allows the capacity of the requesting CPE to be used to store additional media content.

Block 60 relates to logging the recording request. The log may be kept by the recording controller and used for determining whether the requested media content is no longer available and/or likely to become unavailable from the network. For example, if the customer request recording of a television program that is to be removed from the on demand platform of the media provider within the near future, the recording controller may be configured to facilitate transferring a copy thereof to the requesting CPE, in advance of the requested program being removed from the network.

Optionally, the CPE may be configured to periodically export a media content request log to the recording controller. The log may be used by the recording controller to periodically check whether the requested media content is to become unavailable from the network. Transporting the log to the recording controller rather than having the recording controller store the logs may ameliorate storage demands on the controller.

Block 64 relates to determining whether requested media content is to become unavailable from the network. The recording controller may be configured to receive deletion requested, program removal, or other instructions from the media provider and the CPE in a removal file. The removal file may be used to indicate media content that is to become unavailable from the network. The recording controller may then compare the requested media content logs provided by the CPE to the removal file to determine whether the media content is to become unavailable from the network.

Block 68 relates to preventing the CPE from recording the requested media content if the media is still believed to be available from the network. The recording controller may be configured to instruct the CPE not to record the media content as requested if the media content is available from the network at the request of the CPE. The recording prevention may be transparent or otherwise undetectable to the user. For example, the CPE interface associated with requesting the recording may show the requested media to be ready for immediate viewing even thought the media is not actually stored on the CPE.

Block 72 relates to playback of the media content when requested by the CPE. The playback may automatically occur upon request from the user in a transparent manner such that the user is unaware of whether the media is being source from a network resource or the CPE, i.e., the user is unaware of where the media resides. Optionally, the playback may include any number of transmission mechanisms and procedures suitable to facilitating playback. This may include providing DVR related controls (pause, rewind, fast forward, etc.) and any number of other controls that would otherwise be available if the media was stored locally on the CPE.

Block 76 relates to scheduling recording of the requested media content if the media content is to become unavailable from the network. This may include the media provider and/or CPE having a copy of the requested media content transported to the media content directly to the requesting CPE. This may be done in a point-to-point transfer and/or through a multi-cast or broadcast transfer, such as if multiple CPEs are requesting recording of the same program. Optionally, the recording and media content transferal may be scheduled for non-use or limited-use periods. For example, the source having the media content may be configured to transmit the requested media content at a time of day when bandwidth constraints are less and/or times of day when the receiving CPE is less likely to be in use.

Alternatively, the media provider may alter a program scheduling to transport the requested content through channels used for other broadcasts. In more detail, if the requested media content is related to a program of high demand such that multiple CPEs are requesting the same recording, to ameliorate multiple transports or other bandwidth consumption, the media provider may show the program at a non-scheduled time on a particular channel. The recording controller may instruct the correspond CPEs to record the program at the new time and channel.

The scheduled recording, whether the recording is associate with Block 52 or Block 72, may be override or limited as a function of recording privileges. The recording privileges may relate to rules or other parameters associated with the recording capabilities of the CPE. These privileges may be used to prioritize recording capabilities as the recording capacity of the CPE may be limited. For example, certain users may include rights above those of other users such that recording may be permitted or denied according to a hierarchal relationship of the users. Likewise, recording privileges may be dictate according to content, ratings, genres, and other parameters associated with the subject matter of the requested content such some subject matter is permitted for recording and other subject matter is denied.

As described above, the recording controller may be configured to determine the availability of the media content and to perform any number of operations as a function thereof. Of course, however, the present invention is not so limited and fully contemplates integrating any of the functions of the recording controller with the operation of the CPE or other element in the system. In particular, the present invention fully contemplates the CPE being configured to assess whether requested media content is available from the network and to perform any of the above-described operations as a function thereof.

In the case of DVRs, for example, storage capacity is finite and tends to consistently stay at 100% of capacity, with user preferences mandating what content may be deleted for future recordings. One aspect of the present invention involves intelligently integrating network resources and availability with local DVR resources to manage DVR storage capacities. For example, if a DVR has a set of series recording for a particular program, and that program is available through another network resource, such as from a video on demand platform of the content provider or from another piece of CPE, the CPE requesting recordation of that program may be instructed not to record the program and instructed instead to retrieve it from the network resource.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method, comprising:
   receiving, from a first computing device, a first request to record video content;
   allowing, based on determining that on demand access to the video content is to become unavailable from a media service provider, the first request;
   receiving, from a second computing device, a second request to record the video content;

denying, based on determining that the first computing device recorded the video content, the second request; and causing, based on the second request, the first computing device to initiate a peer-to-peer transmission, to the second computing device, of the video content.

2. The method of claim 1, further comprising:
determining a time to cause the first computing device to transmit the video content to the second computing device.

3. The method of claim 2, wherein determining the time is based on one or more of:
a non-use period of time associated with the second computing device, or
a limited-use period of time associated with the second computing device.

4. The method of claim 2, wherein determining the time is based on a bandwidth constraint associated with the first computing device.

5. The method of claim 2, wherein determining the time is based on a time period when the first computing device is unlikely to be in use.

6. The method of claim 2 further comprising:
causing the second computing device to record the video content.

7. The method of claim 1, further comprising:
determining, based on one or more parameters associated with subject matter of the video content, that the video content is permitted to be recorded by the first computing device.

8. The method of claim 2, wherein the determining the time comprises determining that the video content is permitted to be recorded.

9. The method of claim 1, wherein causing the first computing device to initiate the peer-to-peer transmission is performed based on determining that a number of requests for the video content satisfies a threshold.

10. The method of claim 1, wherein the first computing device and the second computing device are in communication via a private network.

11. The method of claim 1, wherein the first computing device comprises a subscriber device associated with the media service provider.

12. The method of claim 1, further comprising:
preventing, based on determining that the first computing device stores the video content, recording of the video content by a third computing device.

13. The method of claim 1, wherein the first computing device comprises one or more of: a set-top box, a digital video recorder, a personal computer, a television, a media terminal adapter, a personal digital assistant, a mobile device, or a personal media device.

14. The method of claim 1, wherein causing the first computing device to initiate the peer-to-peer transmission comprises initiating a multicast, from the first computing device and to a plurality of other devices, of the video content.

15. A method, comprising:
receiving, from a first computing device, a first request to record video content;
allowing, based on determining that a number of requests for the video content satisfies a threshold, the first request;
receiving, from a second computing device, a second request to record the video content;
denying, based on the video content being available from the first computing device, the first request; and
causing the first computing device to initiate a peer-to-peer transmission, to the second computing device, of the video content.

16. The method of claim 15, wherein the first computing device and the second computing device are in communication via a private network.

17. The method of claim 15, wherein the first computing device comprises a subscriber device of a service provider.

18. A method, comprising:
receiving ,from a first computing device, a first request to record video content;
causing, based on the first request and based on
determining that on demand access to the video content is to become unavailable from a media service provider, the first computing device to record the video content;
receiving, from a second computing device, a second request to record the video content; and
causing, based on the second request and based on determining that the first computing device recorded the video content, the first computing device to initiate a peer-to-peer transmission, to the second computing device, of the video content.

19. The method of claim 18, wherein the first computing device and the second computing device are in communication via a private network.

20. The method of claim 18, wherein the first computing device comprises a subscriber device associated with the media service provider.

* * * * *

UNITED STATES PATENT AND TRADEMARK OFFICE
CERTIFICATE OF CORRECTION

PATENT NO. : 10,349,132 B2
APPLICATION NO. : 14/456891
DATED : July 9, 2019
INVENTOR(S) : Harrar et al.

Page 1 of 1

It is certified that error appears in the above-identified patent and that said Letters Patent is hereby corrected as shown below:

In the Specification

Column 2, Detailed Description of the Preferred Embodiment(s), Line 7:
Please delete "gaining," and insert --gaming,--

In the Claims

Column 8, Claim 18, Line 29:
Delete "receiving ,from" and insert --receiving, from--

Column 8, Claim 18, Line 31:
After "on", delete "¶"

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*